United States Patent

Sakamoto et al.

[11] Patent Number: 5,871,606
[45] Date of Patent: Feb. 16, 1999

[54] METHOD OF MAKING A PNEUMATIC TIRE WITH DIFFERENT CARCASS CORD ELONGATIONS BETWEEN MAIN PORTION AND TURNED-UP PORTIONS

[75] Inventors: Masayuki Sakamoto, Shirakawa; Masahiro Hanya, Kobe, both of Japan

[73] Assignee: Sumitomo Rubber Industries, Ltd., Hyogo-Ken, Japan

[21] Appl. No.: 890,558

[22] Filed: Jul. 9, 1997

Related U.S. Application Data

[62] Division of Ser. No. 583,842, Jan. 11, 1996, Pat. No. 5,730,815.

[30] Foreign Application Priority Data

Jan. 10, 1995 [JP] Japan .................................. 7-18679

[51] Int. Cl.⁶ .............................. B29D 30/38; D02G 3/48
[52] U.S. Cl. ...................... 156/133; 156/110.1; 156/123
[58] Field of Search .................................. 152/556–557, 152/552, 554; 156/133, 123, 110.1

[56] References Cited

U.S. PATENT DOCUMENTS

| | | | |
|---|---|---|---|
| 3,275,056 | 9/1966 | Menell | 152/556 |
| 3,327,753 | 6/1967 | Travers | 152/556 X |
| 3,581,793 | 6/1971 | Wittneben | 152/556 X |
| 3,665,993 | 5/1972 | Wittneben | 152/556 |

*Primary Examiner*—Adrienne Johnstone

[57] ABSTRACT

A pneumatic tire comprises a carcass ply made of organic fiber cords extending continuously from one edge to the other and turned up around bead cores to form a pair of turned-up portions and a main portion disposed therebetween, the carcass cords having a difference in elongation percentage, wherein the difference $E_a - E_b$ of the elongation percentage $E_a$ in the main portion from the elongation percentage $E_b$ in the turned-up portions is in the range of from 0.5% to 2.0%.

2 Claims, 2 Drawing Sheets

METHOD OF MAKING A PNEUMATIC TIRE WITH DIFFERENT CARCASS CORD ELONGATIONS BETWEEN MAIN PORTION AND TURNED-UP PORTIONS

This application is a divisional of application Ser. No. 08/583,842, filed on Jan. 11, 1996 now U.S. Pat. No. 5,730,815, the entire contents of which are hereby incorporated by reference.

BACKGROUND AND SUMMARY OF THE INVENTION

The present invention relates to a pneumatic tire, more particularly to a low noise tire with an improved carcass structure.

In recent years, there is a great demand for low noise tires. It has been known that tire noise decreases if the tire rigidity is decreased. However, this greatly deteriorates the running performance of the vehicle, such as its steering stability. Thus, in order to improve the steering stability, if additional reinforcing layers are disposed in the tire sidewall portions, the tire weight increases and the tire uniformity tends to be disturbed, and furthermore the ride comfort deteriorates. Thus, the decrease in the tire rigidity is nullified.

It is therefore, an object of the present invention to provide a pneumatic tire, in which the noise is reduced without sacrificing the steering stability, ride comfort, and the like.

According to one aspect of the present invention, a pneumatic tire comprises a tread portion, a pair of axially spaced bead portions with a bead core disposed therein, a pair of sidewall portions, a carcass comprising a carcass ply turned up around the bead cores to form a pair of turnup portions and a main portion disposed therebetween. The main portion extends between the bead portions through the tread portion and sidewall portions. The turnup portions are disposed axially outside of the main portion. The carcass ply is made of organic fiber cords extending continuously from one of the ply edges to the other, and is characterized by the carcass cords having a difference in elongation percentage between the main portion and turnup portions. The difference (Ea–Eb) of the elongation percentage Ea in the main portion, from the elongation percentage Eb in the turnup portions is in the range of from 0.5% to 2.0%.

The elongation percentage means the elongation percentage specified in the "Testing Method for Chemical Fiber Tire Cords" of Japanese industrial standard JIS-L1017, Section 7.7 (Elongation Percentage in Constant Load) and 7.1.1 (Test in Standard Condition).

Preferably, the carcass consists of only the above-mentioned turned-up carcass ply, and the radially outer ends of the turnup portions thereof are disposed radially outward of the maximum tire section width position.

Therefore, in comparison with the turned-up portions, the main portion has a higher elongation percentage, and the carcass cord tension is decreased. As a result, vibrations which are received by the tread portion when running on rough road surfaces are hindered from spreading. Further, the tire resonance frequency shifts downward from the resonance frequency of the car bodies. Thus, the noise can be effectively reduced.

As the turned-up portions have a lower elongation percentage, the tire maintains its precise shape and dimensions, and the running performance such as steering stability can be maintained.

If the difference in the elongation percentage is less than 0.5%, the noise reducing effect can not be obtained. If the difference is more than 2.0%, the noise reducing effect does not increase any more, and the steering stability is lowered.

Another to another aspect of the present invention, a method of making a pneumatic tire, having a carcass ply of organic fiber cords turned up around bead cores to form a pair of turned-up portions and a main portion disposed therebetween, comprises the steps of building a raw pneumatic tire having the carcass ply and vulcanizing the raw pneumatic tire in a mold, wherein the carcass cords are provided with a difference in elongation percentage between the main portion and the turned-up portions, the difference (Ea–Eb) of the elongation percentage Ea in the main portion, from the elongation percentage Eb in the turned-up portions being in the range of from 0.5% to 2.0%. The difference in elongation percentage is provided, for example, by heating the main portion before vulcanizing the tire.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
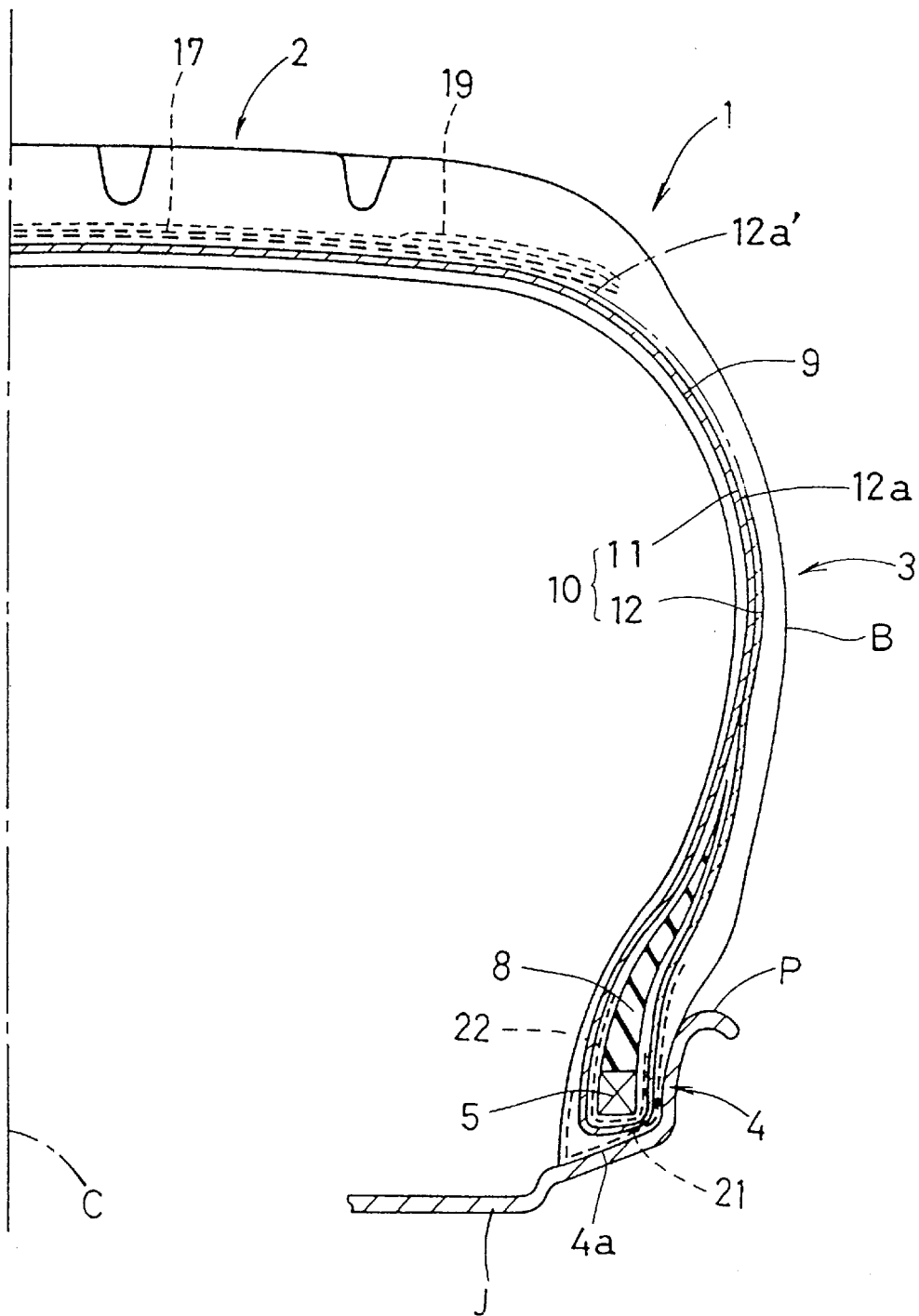
FIG. 1 is a cross sectional view of a right half of a tire according to the present invention.
Figure 2:
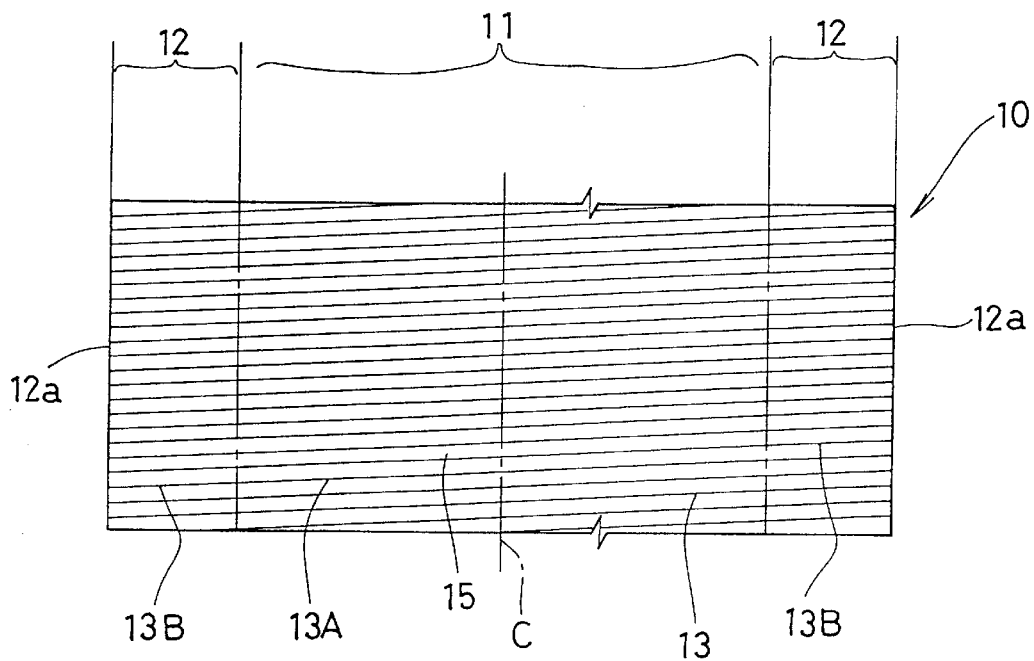
FIG. 2 is a plan view of a strip of rubberized carcass cord fabric which forms the turned-up carcass ply.

In FIGS. 1 and 2, the pneumatic tire 1 comprises a tread portion 2, a pair of axially spaced bead portions 4, a pair of sidewall portions 3 extending therebetween, a pair of bead cores 5 each disposed in each bead portions 4, a bead apex 8 disposed in each bead portion and extending radially outwardly from the bead core 5, a carcass 9 extending between the bead portions 4, and a belt 17, 19 disposed radially outside the carcass 9 in the tread portion 2.

The above-mentioned carcass 9 comprises a turned-up carcass ply 10. The turned-up carcass ply 10 extends between the bead portions 4 through the tread portion 2 and sidewall portions 3 and turns up around the bead core 5 in each bead portion 4 from axially inside to axially outside of the tire, thereby forming a pair of turnup portions 12 and a main portion 11 therebetween.

Each turnup portion 12 extends radially outwardly from the bead base along the axially outside of the bead apex 8, and the radially outer end 12a thereof is disposed radially outward of the radially outer end of a flange of a standard rim J. Preferably, the end 12a is disposed radially outward of the radially outer end of the bead apex 8, and in this embodiment, outward of the maximum tire section width point B.

The turned-up carcass ply 10 is made of organic fiber cords 13, e.g. nylon, polyester, rayon, aromatic polyamide and the like which are arranged radially at an angle of 90 to 70 degrees to the tire equator C.

In this embodiment, the whole ply 10, that is, the main portion 11 and turned-up portions 12 are made of, materially, the same organic fiber cords 13 having a denier and cord diameter that is substantially the same. In other words, the organic fiber cords 13 are continuous between the main portion 11 and the turned-up portions 12.

However, according to the present invention, the elongation percentage Ea of the carcass cords 13A (cord part) in the main portion 11 is larger than the elongation percentage Eb of the carcass cords 13B (cord part) in the turned-up portions 12. The difference (Ea–Eb) is in the range of from 0.5% to 2.0%.

The belt in this embodiment comprises a breaker belt 17 disposed on the radially outside of the crown portion of the carcass 9 to increase the rigidity of the tread portion 2, and a band belt 19 disposed on the radially outside of the breaker belt 17 to prevent the breaker belt 17 from being lifted by centrifugal force at the time of high speed running.

The breaker belt 17 comprises two plies of parallel cords laid at a certain inclination angle with respect to the tire equator C so that the cords of each ply cross the cords of the other ply.

For the breaker belt cords, organic fiber cords, e.g. nylon, rayon, polyester, aromatic polyamide and the like and steel cords can be used.

The band belt 19 comprises a pair of axially spaced narrow plies disposed on the edge portions of the breaker belt and a wide ply disposed radially outside thereof to extend over the entire width of the breaker belt.

Each ply can be formed by spirally winding at least one cord around the tire or by winding a strip of rubberized parallel cords.

The band cord angle with respect to the tire circumferential direction is substantially zero or very small in comparison with the breaker cord angle.

Each bead portion 4 in this embodiment is further provided with a chafer 21 and a filler 22 to reinforce the bead portion 4.

The chafer 21 in this example is made of synthetic or natural fiber formed in a net-like shape. The chafer extends along the axially inner surface and bottom surface 4a of the bead portion 4 and the axially outer surface of the carcass turnup portion 12.

The filler 22 is made of synthetic or natural fiber similar to the above disposed between the carcass ply and the bead core 5 so as to wrap the bead core 5 therein.

The chafer 21 and filler 22 help to increase the vertical and lateral rigidity of the bead portion 4. Such construction is however optional and thus may be omitted.

The above-mentioned bead apex 8 is made of hard rubber extending and tapering from the bead core 5 towards the radially outside thereof.

Figure 3:
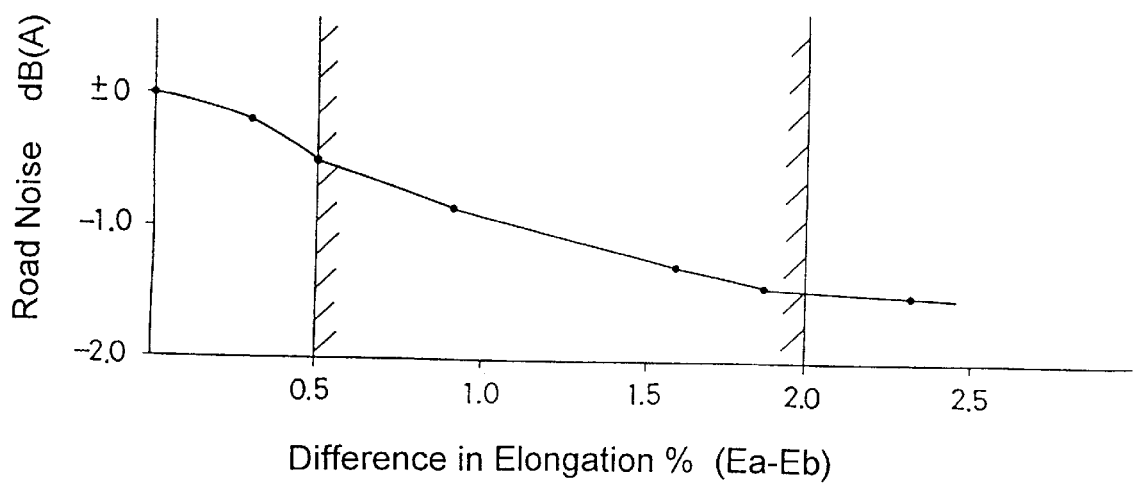
FIG. 3 is a graph showing the relationship between the difference in elongation percentage and road noise.

FIG. 3 shows the relationship between the difference (Ea–Eb) and the road noise obtained by the following tests.

Test tires of size 195/65R15 were made and tested for not only the road noise but also the car's-outside noise, steering stability and ride comfort.

The test tires had the same structure (1-0 HTU) shown in FIG. 1 except for the difference (Ea–Eb) in the elongation percentage between the carcass main portion and the turnup portions.

In the tests, the tires were mounted on a standard rim of size 15×6JJ and installed in a 2500 cc FF passenger car. The car was run with only a test driver, and the following performances were measured.

1) Car's-outside noise

The overall noise when running at a speed of 60 km/h was measured according to the testing method for car's-outside noise specified in JASO Z101-83, a standard in Japan.

2) Road noise

The overall noise when running on a rough asphalt road at a speed of 50 km/h was measured.

In Table 1, the noise is indicated in dBA by the difference from the conventional tire (Con.).

3) Steering stability and Ride comfort

The steering stability and ride comfort were evaluated by the driver into three ranks A–C. (A: good, B: slightly bad, C: bad).

The elongation percentage Ea and Eb was measured according to JIS-L1017, Sec. 7.1.1 (Test in Standard Condition) as mentioned above, using test samples took out from the tires. As the carcass cords used in the tests was a 1500d/2 polyester cord, the load is 6.8 kg per a cord. {4.5 kg×(1500×2)/(1000×2)}

The specifications of the tire and test results are shown in Table 1.

From the tests, it was confirmed that the example tires decreased in noise while maintaining the steering stability and ride comfort at a good level, in contrast with the conventional tire and reference tires.

FIG. 2 shows a strip of rubberized cord fabric 15 used to make the turned-up carcass ply 10. As explained above, the carcass cords 13 extend continuously from one edge 12a to the other edge 12a.

The above-mentioned difference in the elongation percentage can be provided by, for example, heating only the main portion 11 in its raw material state before vulcanizing the tire. By doing so, the carcass cords 13A in this main portion 11 are heat shrunk in advance, and after the vulcanization, in the finished tire, the elongation percentage in the main portion becomes larger than that in the turned-up portions 12. As the carcass cords 13A and 13B of the main portion 11 and turnup portions 12 are the same with respect to the thickness and material, it is easy to adjust the difference (Ea–Eb).

Further, the difference may be provided by changing a dipping treatment for the carcass cords, or increasing the bead-to-bead carcass cord path by increasing the width of a carcass former (drum) used to build a raw tire.

For example, a method of making the tire comprises the steps of making a strip of rubberized cord fabric 15, winding the strip 15 around an expandable cylindrical carcass former, winding the bead cores on the strip 15 along the boundary lines between the main portion 11 and portions 12, expanding the carcass former while decreasing its width between the bead cores so that the main portion 11 has a toroidal shape, turning up the portions 12, placing the belt around the crown portion of the carcass, placing the other reinforcing layers, rubber layers and the like, and vulcanizing the assembly or raw tire in a mold, and according to the invention the method further includes, before the vulcanizing step, steps of providing the difference (Ea–Eb) by, for example, heating the main portion 11 of the carcass ply except the turnup portions 12.

In this invention, it is possible to extend the turnup portions 12 to the buttress portion of the tire so as to form the so called 1-0 ultra high turnup structure wherein, as shown in FIG. 1 by an imaginary line, the end 12a' thereof is disposed between the carcass and belt edge and the carcass consists of a single carcass ply 10. Further, it is also possible to modify the carcass such that the carcass consists of a plural number (n) of the turned-up carcass plies 10 to have a n-0 carcass structure, or the carcass consists of the turned-up carcass ply 10 and an outer carcass ply along the axially outside of the turnup portion 12 to have a 1—1 structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Tire | Ex.1 | Ex.2 | Ex.3 | Ex.4 | Con. | Ref.1 | Ref.2 |
|---|---|---|---|---|---|---|---|
| Tire structure | | | | FIG. 1 | | | |
| Breaker belt | | | | | | | |
| No. of ply | | | | 2 | | | |
| Cord material | | | | steel | | | |
| Cord count | | | | 40 ends | | | |
| Cord angle | | | | 22 deg. to tire equator | | | |
| Carcass | | | | | | | |
| No. of ply | | | | 1 | | | |
| Cord material | | | | polyester(1500d/2) | | | |
| Cord count | | | | 52 ends | | | |
| Cord angle | | | | 90 deg. to tire equator | | | |
| Ea (%) | 5.5 | 5.9 | 6.6 | 6.9 | 5.0 | 7.3 | 0.3 |
| Eb (%) | 5.0 | 5.0 | 5.0 | 5.0 | 5.0 | 5.0 | 5.0 |
| Ea–Eb | 0.5 | 0.9 | 1.6 | 1.9 | 0 | 2.3 | 0.3 |

TABLE 1-continued

| Tire | Ex.1 | Ex.2 | Ex.3 | Ex.4 | Con. | Ref.1 | Ref.2 |
|---|---|---|---|---|---|---|---|
| Test result | | | | | | | |
| Outside noise dB(A) | −0.3 | −0.6 | −0.9 | −1.0 | 0 | −1.1 | −0.1 |
| Road noise dB(A) | −0.6 | −0.8 | −1.2 | −1.4 | 0 | −1.4 | −0.2 |
| Steering stability | A | A | A | A to B | A | C | A |
| Ride comfort | A | A | A | A | A | A | A |

We claim:

1. A method of making a pneumatic tire laving a carcass ply of organic fiber cords turned up around bead cores to form a pair of turned-up portions and a main portion disposed therebetween, said method comprising the steps of
   building a raw pneumatic tire having the carcass ply and vulcanizing the raw pneumatic tire in a mold,
   wherein the carcass cords are provided with a difference in elongation percentage between the main portion elongation percentage Ea and the turned-up portions elongation percentage Eb, whereby the difference Ea–Eb is in the range of from 0.5% to 2.0%.

2. The method according to claim 1, wherein said difference in elongation percentage is provided by heating the main portion before vulcanizing the tire.

* * * * *